United States Patent [19]
Dussault

[11] Patent Number: 5,652,378
[45] Date of Patent: Jul. 29, 1997

[54] FUEL CONSUMPTION ESTIMATING METHOD

[75] Inventor: Robert G. Dussault, East Peoria, Ill.

[73] Assignee: Caterpillar Inc., Peoria, Ill.

[21] Appl. No.: 698,615

[22] Filed: Aug. 16, 1996

[51] Int. Cl.$^6$ ............................................. G01M 15/00
[52] U.S. Cl. .................. 73/114; 73/117.3; 340/450.2; 364/431.03
[58] Field of Search ................. 73/115, 116, 117.2, 73/117.3, 118.1, 119 A, 113, 114, 196, 198, 199, 861.06; 340/439, 442, 450.2; 364/431.03, 431.04

[56] References Cited

U.S. PATENT DOCUMENTS

| | | | |
|---|---|---|---|
| 4,397,178 | 8/1983 | Chiba et al. | 73/117.3 |
| 4,459,671 | 7/1984 | Teass et al. | 73/114 |
| 4,845,630 | 7/1989 | Stephens | 73/114 |
| 5,301,113 | 4/1994 | To et al. | 73/114 |
| 5,431,042 | 7/1995 | Lambert et al. | 73/116 |
| 5,505,076 | 4/1996 | Parkman et al. | 73/113 |
| 5,578,748 | 11/1996 | Brehob et al. | 73/114 |

*Primary Examiner*—George M. Dombroske
*Attorney, Agent, or Firm*—Alan J. Hickman

[57] ABSTRACT

A method for estimating the fuel consumption of a tractor and trailer combination during a test period and identify at least one of a plurality of operating conditions attributable to the actual total fuel consumption being a preselected minimum amount greater than the estimated total fuel consumption. A processor determines a correction factor for each of the plurality of operating conditions and a related estimated fuel consumption penalty or gain. The processor determines a combined correction factor and a related total estimated fuel consumption for the combined correction factors. The estimated fuel consumption penalties or gains and the total estimated fuel consumption are displayed on a monitor.

19 Claims, 10 Drawing Sheets

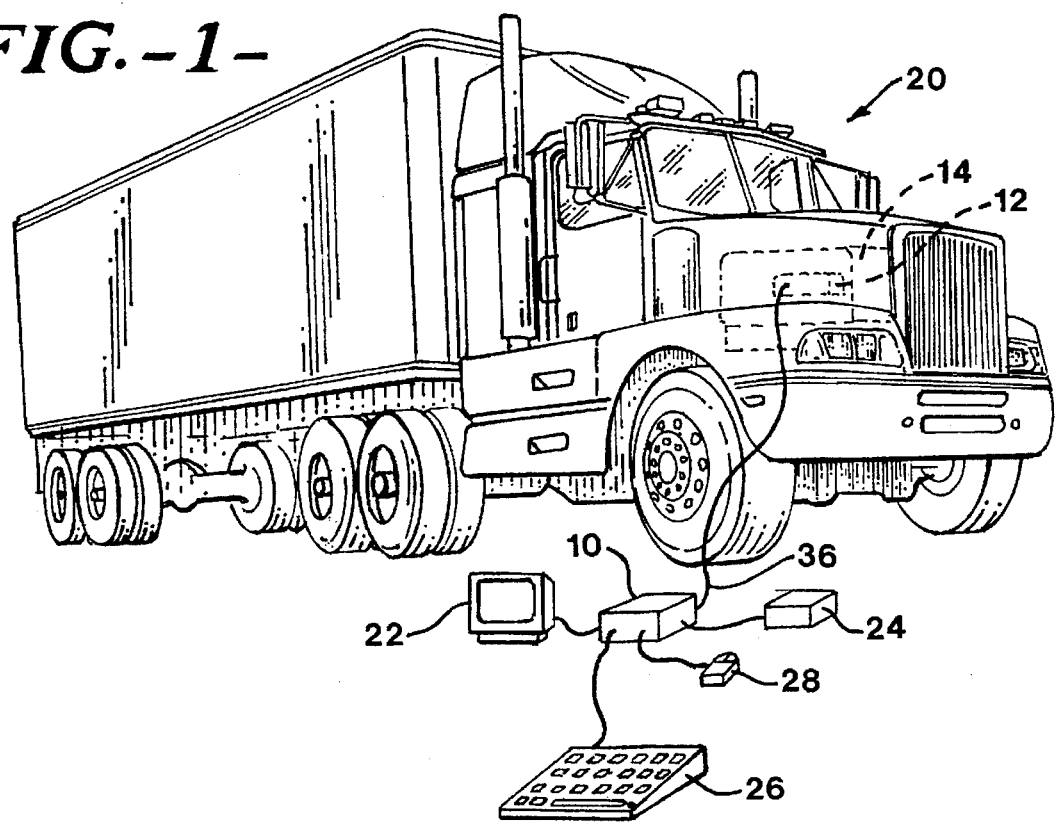
FIG.-1-
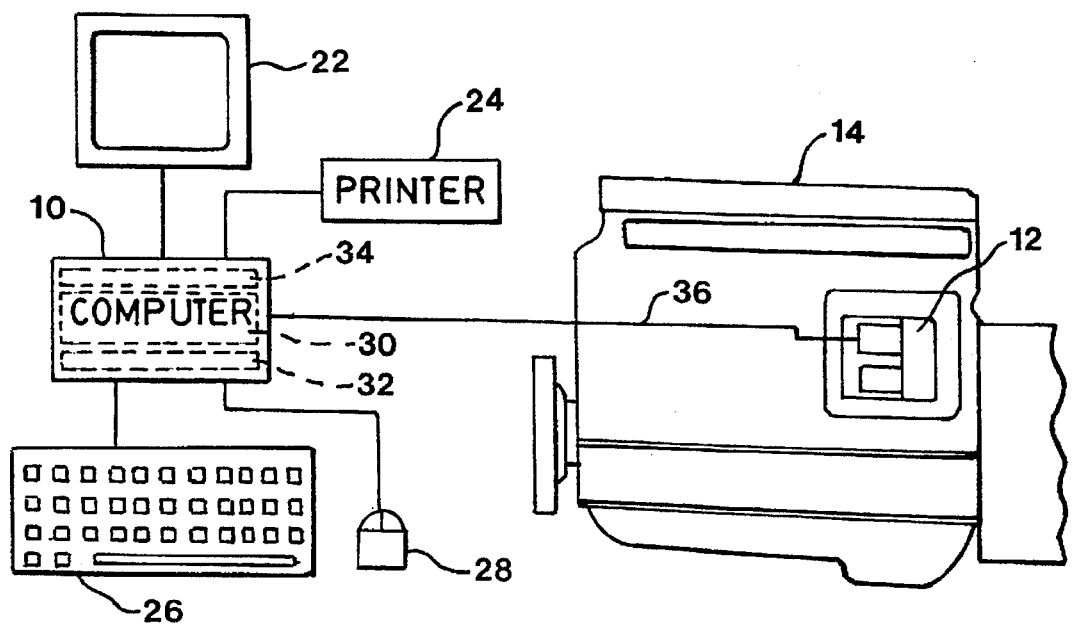
FIG. - 2 -

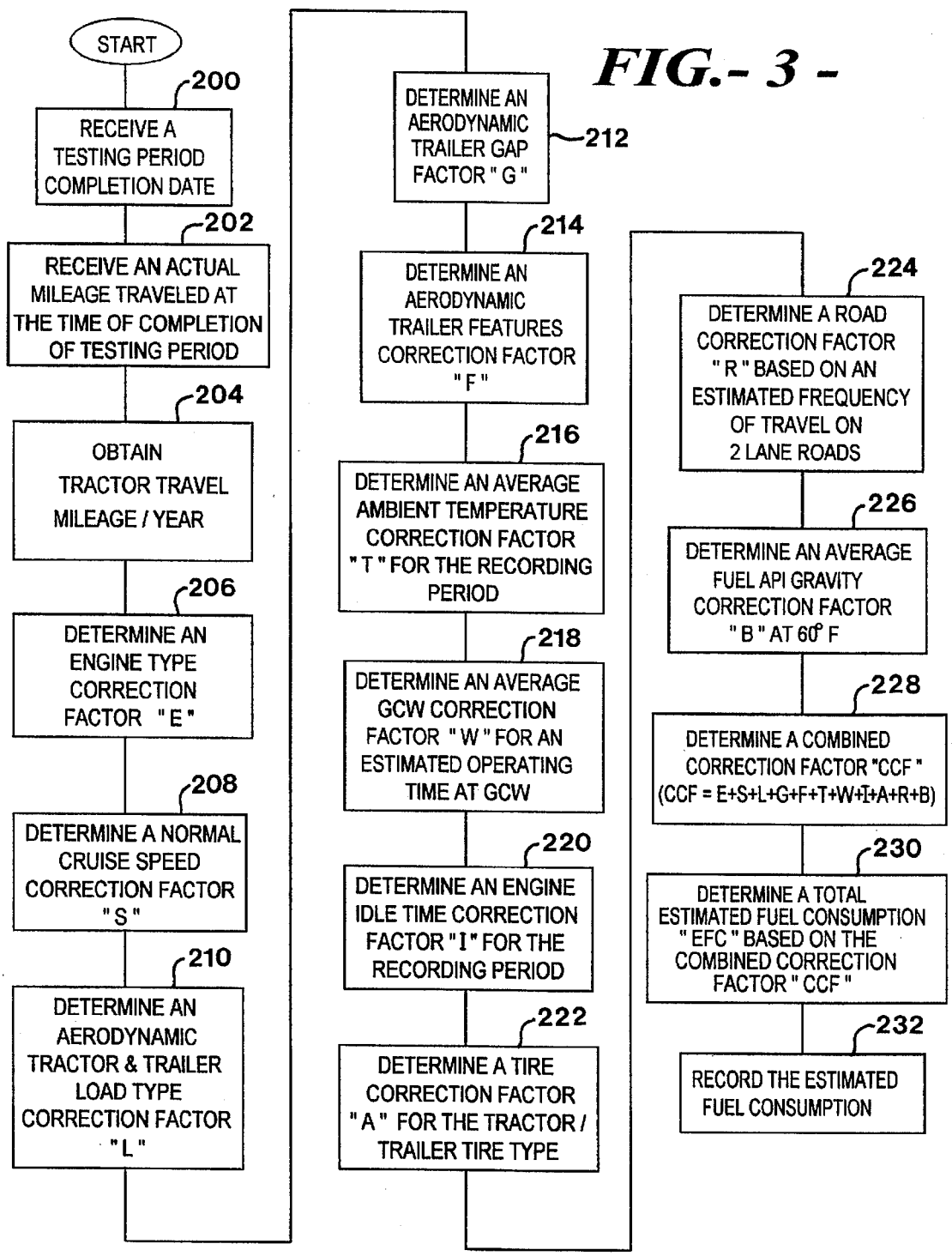
FIG.- 3 -

FIG. - 4 -

| Engine Type Correction Factor Table (38) ||
|---|---|
| Electronic Engines | Mechanical Engines |
| 3406E (5EK).....................( ) | 3406C (8PN/3ZJ)..........( ) |
| 3406C (4CK/2EK)............( ) | 3406B (4MG).....................( ) |
| C12 (1YN).......................( ) | |
| C10 (2PN).......................( ) | |
| 3176B (9CK)...................( ) | 3306C (9TL).....................( ) |
| 3176 (7LG7500-up).........( ) | |
| Series 60 (DDEC III).......( ) | |
| Series 60 (DDEC II)........( ) | |
| N14E................................( ) | N14..................................( ) |
| M11..................................( ) | |

FIG. - 5 -

Cruise Speed Correction Factor Table (40)

| | | | | | | |
|---|---|---|---|---|---|---|
| 39 ___ | 40 ___ | 41 ___ | 42 ___ | 43 ___ | 44 ___ | 45 ___ |
| 46 ___ | 47 ___ | 48 ___ | 49 ___ | 50 ___ | 51 ___ | 52 ___ |
| 53 ___ | 54 ___ | 55 ___ | 56 ___ | 57 ___ | 58 ___ | 59 ___ |
| 60 ___ | 61 ___ | 62 ___ | 63 ___ | 64 ___ | 65 ___ | 66 ___ |
| 67 ___ | 68 ___ | 69 ___ | 70 ___ | 71 ___ | 72 ___ | 73 ___ |
| 74 ___ | 75 ___ | 76 ___ | 77 ___ | 78 ___ | 79 ___ | 80 ___ |

| Tractor Category | Trailer | | | | | | | |
|---|---|---|---|---|---|---|---|---|
| | Height | | Type | | | | | |
| | 13.5' | 10.5' | Dry Van | Refer | Tanker | Bottom / Rear Dump | * Flatbed / Wagon / Pole | Livestock |
| A | ■ | --- | | | | | | |
| | --- | ■ | --- | --- | | | | --- |
| B | ■ | --- | | | | | | |
| | --- | ■ | --- | --- | | | | --- |
| C | ■ | --- | | | | | | |
| | --- | ■ | --- | --- | | | | --- |
| D | ■ | --- | | | | | | |
| | --- | ■ | --- | --- | | | | --- |

Load Type Correction Factor Table

* Flatbed = Platform trailer (Not Lowboy)   Wagon = Covered Wagon   Pole = Logging trailer

| Trailer Height | Trailer Gap * | | | | | |
|---|---|---|---|---|---|---|
| | 1' | 2' | 3' | 4' | 5' | 6' and up |
| 10.5' | | | | | | |
| 13.5' | | | | | | |

Trailer Gap Correction Factor Table

* Tankers: 0% for all trailer gaps

FIG. - 8 -

| Trailer Features Correction Factor Table | | |
|---|---|---|
| | \multicolumn{2}{c|}{Trailer / Load Height} |
| | 10.5' | 13.5' |
| No Selection | | |
| Vertical Ribs - Dry Van & Refer<br>    - Tankers; Bottom / Rear Dump; Livestock | | |
| Soft Sides / Curtains - Dry Van only | | |
| Tarp   - Dry Van only | | |
| Braces / Supports (13.5' Tankers only) | | |
| Open Top -Dry Van; Bottom / Rear Dump; Wagon<br>   % of total miles traveled .................... 25%<br>                 50%<br>                 75%<br>                 100% | | |
| Doubles (Double Bottom) / Triples (Triple Bottom)<br>     Trailer Gap .................. 3' or less<br>                4'<br>                5'<br>                6' or more | | |

FIG. - 9 -

| | | Average Daily Ambient Temperature Correction Factor Table /48 | | | | | | | | | | | |
|---|---|---|---|---|---|---|---|---|---|---|---|---|---|
| | | Testing Period Ends | | | | | | | | | | | |
| | | JAN | FEB | MAR | APR | MAY | JUN | JUL | AUG | SEP | OCT | NOV | DEC |
| T e s t i n g   P e r i o d | 1 Mo | | | | | | | | | | | | |
| | 2 Mo | | | | | | | | | | | | |
| | 3 Mo | | | | | | | | | | | | |
| | 4 Mo | | | | | | | | | | | | |
| | 5 Mo | | | | | | | | | | | | |
| | 6 Mo | | | | | | | | | | | | |
| | 7 Mo | | | | | | | | | | | | |
| | 8 Mo | | | | | | | | | | | | |
| | 9 Mo | | | | | | | | | | | | |
| | 10 Mo | | | | | | | | | | | | |
| | 11 Mo | | | | | | | | | | | | |
| | 1 Year | | | | | | | | | | | | |
| | 1 Yr, 1 Mo | | | | | | | | | | | | |
| | 1 Yr, 2 Mo | | | | | | | | | | | | |
| | 1 Yr, 3 Mo | | | | | | | | | | | | |
| | 1 Yr, 4 Mo | | | | | | | | | | | | |
| | 1 Yr, 5 Mo | | | | | | | | | | | | |
| | 1 Yr, 6 Mo | | | | | | | | | | | | |
| | 1 Yr, 7 Mo | | | | | | | | | | | | |
| | 1 Yr, 8 Mo | | | | | | | | | | | | |
| | 1 Yr, 9 Mo | | | | | | | | | | | | |
| | 1 Yr, 10 Mo | | | | | | | | | | | | |
| | 1 Yr, 11 Mo | | | | | | | | | | | | |
| | 2 Years | | | | | | | | | | | | |
| | 2 Years + | | | | | | | | | | | | |

| Idle Time Correction Factor Table | |
|---|---|
| | 0 % ____  5 % ____  10 % ____  15 % ____ |
| | 20 % ____  25 % ____  30 % ____ |
| Sleeper \ Mechanical Engines | 35 % ____  40 % ____  45 % ____  50 % ____ |
| | 55 % ____  60 % ____  65 % ____  70 % ____ |

| Tire Correction Factor Table | | | | | | | |
|---|---|---|---|---|---|---|---|
| | Bias | Radial | Recaps | Super Single | *LRR, L/P | Lug / Snow Grip | Deep Tread (24/32" - up) |
| Tractor | | | | | | | |
| Trailer | | | | | | | |
| Total | | | | | | | |

| Average API Fuel Gravity Correction Factor Table |
|---|
| 33 ____  34 ____  35 ____  36 ____  37 ____  38 ____ |
| 39 ____  40 ____  41 ____  42 ____  43 ____  44 ____ |
| 45 ____  46 ____  47 ____  48 ____  49 ____  50 ____ |

FIG. - 10 -

Average GCW Correction Factor Table

| GCW Pounds (000) | Time operating at GCW ||||||||
|---|---|---|---|---|---|---|---|---|
| | 100% | 85 to 90% | 75% | 60 to 65% | 50% | 35 to 40% | 25% | 10 to 15% |
| 40 | | | | | | | | |
| 45 | | | | | | | | |
| 50 | | | | | | | | |
| 55 | | | | | | | | |
| 60 | | | | | | | | |
| 65 | | | | | | | | |
| 70 | | | | | | | | |
| 75 | | | | | | | | |
| 80 | | | | | | | | |
| 85 | | | | | | | | |
| 90 | | | | | | | | |
| 95 | | | | | | | | |
| 100 | | | | | | | | |
| 105 | | | | | | | | |
| 110 | | | | | | | | |
| 115 | | | | | | | | |
| 120 | | | | | | | | |
| 125 | | | | | | | | |
| 130 | | | | | | | | |
| 135 | | | | | | | | |
| 140 | | | | | | | | |
| 145 | | | | | | | | |
| 150 | | | | | | | | |
| 155 | | | | | | | | |
| 160 | | | | | | | | |

Correction Factors Rounded to the nearest larger whole number:

FIG. - 14 -

| Total Estimated Fuel Consumption Conversion Table (MPG) | | | | |
|---|---|---|---|---|
| -25% = X.X | -7% = X.X | 11% = X.X | 29% = X.X | 47% = X.X |
| -24% = X.X | -6% = X.X | 12% = X.X | 30% = X.X | 48% = X.X |
| -23% = X.X | -5% = X.X | 13% = X.X | 31% = X.X | 49% = X.X |
| -22% = X.X | -4% = X.X | 14% = X.X | 32% = X.X | 50% = X.X |
| -21% = X.X | -3% = X.X | 15% = X.X | 33% = X.X | 51% = X.X |
| -20% = X.X | -2% = X.X | 16% = X.X | 34% = X.X | 52% = X.X |
| -19% = X.X | -1% = X.X | 17% = X.X | 35% = X.X | 53% = X.X |
| -18% = X.X | 0% = X.X | 18% = X.X | 36% = X.X | 54% = X.X |
| -17% = X.X | 1% = X.X | 19% = X.X | 37% = X.X | 55% = X.X |
| -16% = X.X | 2% = X.X | 20% = X.X | 38% = X.X | 56% = X.X |
| -15% = X.X | 3% = X.X | 21% = X.X | 39% = X.X | 57% = X.X |
| -14% = X.X | 4% = X.X | 22% = X.X | 40% = X.X | 58% = X.X |
| -13% = X.X | 5% = X.X | 23% = X.X | 41% = X.X | 59% = X.X |
| -12% = X.X | 6% = X.X | 24% = X.X | 42% = X.X | 60% = X.X |
| -11% = X.X | 7% = X.X | 25% = X.X | 43% = X.X | 61% = X.X |
| -10% = X.X | 8% = X.X | 26% = X.X | 44% = X.X | 62% = X.X |
| -9% = X.X | 9% = X.X | 27% = X.X | 45% = X.X | 63% = X.X |
| -8% = X.X | 10% = X.X | 28% = X.X | 46% = X.X | 64% = X.X |

FIG. - 15 -

| Estimated Fuel Consumption Summary | | | |
|---|---|---|---|
| | MPG penalties | MPG gains | Base Line |
| Engine Selection | X.XX | X.XX | 3406E 5EK |
| Normal Cruise Speed (mph) | X.XX | X.XX | 55 mph |
| Aerodynamics | X.XX | X.XX | |
| Tractor-Trailer Configuration / Type of Load | X.XX | X.XX | Most Aero tractor / Dry Van or Refer |
| Trailer Gap | X.XX | X.XX | 18" or less |
| Other Aerodynamic Factors | X.XX | X.XX | Smooth Exterior |
| Climate | X.XX | X.XX | Dry roads / Wind 3 mph or less |
| Temperature | X.XX | X.XX | 70° F or higher |
| Fuel API Gravity | X.XX | X.XX | 35 API @ 60 F° |
| GCW / % of the time | X.XX | X.XX | 80,000 GWC / 100% of the time |
| Idling Time | X.XX | X.XX | 0 % Idling Time |
| Tires | X.XX | X.XX | Highway Radials |
| % of Miles on 2-Lane Roads | X.XX | X.XX | More than 90% of miles on Interstate |
| Total Estimated Fuel Consumption | X.XX MPG | | |

FUEL CONSUMPTION ESTIMATING METHOD

TECHNICAL FIELD

This invention relates to a method of estimating fuel consumption of an engine driven tractor and trailer combination and more particularly to a method of estimating and displaying fuel consumption and penalties or gains associated with certain parameters attributable to fuel consumption.

BACKGROUND ART

Internal combustion engine driven tractor and trailers combinations encounter various different operating conditions. As conditions change so does the fuel consumption of the engine. For example, the fuel consumption in cold climates is different than fuel consumption in warm climates. Operator driving habits, such as the normal cruise speed of a tractor and trailer combination, affects fuel consumption. Also, the aerodynamics of the tractor and trailer combination affects fuel consumption. These are just a few of the many factors affecting fuel consumption. At present there is no satisfactory way of accurately estimating the fuel consumption of a tractor and trailer combination.

It is beneficial for the operator of a tractor and trailer combination or others associated with such equipment to be able to accurately estimate fuel consumption for the purpose of comparison with the actual fuel consumption. By way of such a comparison the operator is able to determine if the actual fuel consumption was greater or less than the estimated fuel consumption and when required investigate the cause of the deficiency. Since there is no accurate way of estimating fuel consumption for a particular tractor and trailer combination and no present way of pinpointing the key operating conditions causing such a variation, the ability to correct one or more problems causing excessive fuel consumption is not available.

Currently, dynamometer testing of an engine is utilized when the operator or someone associated with the engine driven tractor and trailer combination believes that the volume of fuel being consumed is excessive and that there may be something wrong with the engine. This testing is used to help identify problems associated with the engine, drive train and the like. However such testing is complicated, requires a substantial amount of downtime of the tractor and trailer combination, and is expensive. Further, such testing only identifies engine and/or drive train problems and does not assist one in determining other causes of excessive fuel consumption. A simple more effective, efficient and complete way of determining increased fuel consumption related problems is needed.

The present invention is directed to overcoming one or more of the problems set forth above.

DISCLOSURE OF THE INVENTION

In one aspect of the present invention, a method for estimating the fuel economy of an engine driven tractor and trailer combination comprises the steps of selecting a preselected engine type and determining an engine type correction factor "E" based on the selected engine type; estimating a normal cruise speed of the engine driven tractor and trailer combination and determining a cruise speed correction factor "S" based on the received predetermined estimated normal cruise speed; selecting a tractor category and trailer type and determining an aerodynamic tractor and trailer load type correction factor "L" based on the tractor category and trailer type; selecting a magnitude of space between the tractor and trailer and a trailer height and determining an aerodynamic trailer gap correction factor "G" corresponding to the space between the tractor and trailer and the trailer height; selecting at least one a plurality of special trailer features and determining an aerodynamic trailer features correction factor "F" based on the special trailer features selected; receiving a preselected testing period determining an average daily ambient temperature correction factor "T" for the preselected testing period; selecting a percentage of time of operation at gross capacity weight and the gross capacity weight of the tractor trailer combination and determining an average gross capacity weight correction factor "W" based on the percentage of time of operation at gross capacity weight and the gross capacity weight of the tractor trailer combination; selecting a percentage of time at which the engine is at idle for the testing period and determining an engine idle time correction factor "I" for the percentage of time selected; selecting a tire type in use on the engine driven tractor and trailer combination and determining a tire correction factor "A" based on the preselected tire type in use on the engine driven tractor and trailer combination; selecting an estimated travel frequency on one of a two and a four lane road and determining a road correction factor "R" based on the estimated travel frequency; selecting a predetermined API gravity value at a time of fuel mileage checking and determining an average fuel API gravity correction factor "B" based on the selected API gravity value; summing the correction factors in steps a–k to determine a combined correction factor "CCF"; determining a total estimated fuel consumption "EFC" based on the combined correction factor "CCF"; and recording a magnitude of the total estimated fuel consumption.

In another aspect of the present invention a method for identifying at least one of a plurality of operating conditions attribute to an actual total fuel consumption being greater in magnitude than the magnitude of a total estimated fuel consumption of an engine driven tractor and trailer combination comprises the steps of receiving a plurality of operating condition signals; determining a correction factor for each of the plurality of operating condition signals; determining one of a fuel consumption gain and penalty for each of the plurality of correction factors; listing the one fuel consumption gain and penalty related to each of the plurality of correction factors in a table according to one of a gain and a penalty; and displaying the table on the monitor.

BRIEF DESCRIPTION OF THE DRAWINGS

FIG. 1 is a diagrammatic isometric view of an embodiment of the present invention showing an engine driven tractor and trailer combination;

FIG. 2 is a diagrammatic schematic drawing showing a computer connected to an electronic engine control module;

FIG. 3 is a flow chart showing the logic associated with the method for determining a total estimated fuel consumption for the engine driven tractor and trailer combination;

FIG. 4 shows an Engine Type Correction Factor Table;

FIG. 5 shows a Cruise Speed Correction Factor Table;

FIG. 6 shows a Load Type Correction Factor Table;

FIG. 7 shows a Trailer Gap Correction Factor Table;

FIG. 8 shows a Trailer Features Correction Factor Table;

FIG. 9 shows an Average Daily Ambient Temperature Correction Factor Table;

FIG. 10 shows an Average GCW Correction Factor Table;

FIG. 11 shows an Idle time Correction Factor Table;

FIG. 12 shows a Tire Correction Factor Table;

FIG. 13 shows an Average API Fuel Gravity Correction Factor Table;

FIG. 14 shows a Total Estimated Fuel Consumption Conversion Table; and

FIG. 15 shows an Estimated Fuel Consumption Summary.

BEST MODE FOR CARRYING OUT THE INVENTION

With reference to the drawings and particularly FIGS. 1 and 2, a computer 10 is connected to an electronic control module 12 (ECM) of an internal combustion engine 14 of a tractor 16 and having a trailer 18 pivotally connected to the tractor 16. A combined tractor 16 and trailer 18 is hereinafter referred to as an engine driven tractor and trailer combination 20. The electronic control module 12 monitors various functions such as engine speed, total miles, total hours, idle hours, PTO hours, engine temperature, quantity of fuel used, and the like and controls various engine functions such the fuel injection system, rack and other systems. The computer 10 is connected to a monitor 22, a printer 24 and other suitable output devices. The computer 10 is also connected to a key board 26, a mouse 28 and other suitable peripheral input devices. The computer 10 includes a processor 30, a memory 32 and a hard disc drive 34 all of conventional design, for example, an IBM personal computer. The processor 30 is in electrical communication with the ECM by conductor 36 and receives information from the ECM by way of conductor 36.

The processor 30 executes a method for estimating the fuel consumption of an engine driven tractor trailer combination 20 as shown in FIG. 1 in accordance with preprogrammed instructions. These instructions are stored in the computer and executed at the command of the computer operator. Data related to significant operating conditions (parameters and factors) which affect positively and negatively engine fuel consumption are processed by the computer 10 to determine an estimated fuel consumption in miles per gallon.

With reference to the flow diagram of FIG. 3, as shown in box 200, a date of completion of a testing period of the tractor and trailer combination 20 being tested is received by computer 10 by way of keyboard 26. This date establishes the end base line for all subsequent processing and marks the end of a fuel economy recording period for the tractor and trailer combination 20 being tested.

Referring to box 202, the actual mileage traveled at the time of completion of the testing period is received by the processor 30 from the keyboard 26 or the ECM 12. The actual mileage entered by keyboard 26 is visually obtained from a vehicle odometer (not shown) and entered by the computer operator. The information received by the processor 30 is delivered by way of conductor 36.

Referring to box 204, the annual mileage of the tractor and trailer combination 20 is entered by way of the keyboard 26. This information along with the actual mileage traveled (box 202) is used to determine the length of the testing period (actual mileage ÷ annual mileage). The information from boxes 200–204 is used to establish an average ambient temperature and an average ambient temperature correction factor corresponding to the fuel economy recording period. This will be subsequently discussed in greater detail.

Referring to box 206, the driver or another person knowledgeable in the operation of the particular tractor and trailer combination 20 being tested identifies the type of engine 14 in use from an Engine Type Correction Factor Table 38 such as shown in FIG. 4. The selection of an engine type is made by way of the key board 26, the mouse 28 or by signals delivered over conduit 36 from the ECM 12 to the processor 30. In an embodiment of the present invention, a computer operator simply selects the particular engine type from the table 38 displayed on the monitor. The processor 30, receives a signal related to the particular engine type selected, determines an engine type correction factor "E" for the particular engine type, and records the correction factor "E" for subsequent use. An engine type correction factor in percent is assigned to each of the engine types listed. A negative engine type correction factor has a positive effect on engine fuel economy. Conversely, a positive engine type correction factor has negative effect on engine fuel economy. It is to be recognized that the computer operator may select the engine type in other ways than mentioned without departing from the spirit of the invention.

Referring to box 208, FIG. 3, the driver or another person knowledgeable in the operation of the tractor and trailer combination 20 being tested estimates the normal cruise speed of the tractor and trailer combination 20 in one of two ways. For mechanical engines, engines not having an ECM, an "option A" is utilized. Under option "A", the driver or another person knowledgeable in the operation of the preselected tractor and trailer combination 20 estimates the cruise speed at which he drives most of the time. For electronically controlled engines Option "B" is best utilized. Under option "B", data is obtained electronically by a service tool or directly by the processor 30 through conductor 36. This data includes total miles, total hours, percent idle hours, and percent PTO hours from either a lifetime or a trip segment total. The estimated normal cruise speed is calculated using this data as follows: total miles÷(total hours− total hours (percent idle hours+percent PTO hours))+7 miles/hr.=estimated normal cruise speed. For electronic engines either options "A" or "B" may be used. However, option "B" may improve the normal cruise speed accuracy. Based on the above, the computer operator selects by way of keyboard 26, mouse 28 or other input means one of the estimated normal cruise values listed on the Cruise Speed Correction Factor Table 40, FIG. 5, displayed on the monitor. The processor 30, based on the selection, receives a preselected estimated normal cruise speed value signal and determines a related estimated cruise speed correction factor "S". An estimated cruise speed correction factor in percent is assigned to each of the estimated normal cruise speed values listed on the Cruise Speed Correction Factor Table of FIG. 5.

The aerodynamics of a tractor and trailer combination 20 have a significant effect on fuel consumption and are accounted for by the method of this invention. The tractor and trailer aerodynamics consist of several components. The components include, but are not limited to, a tractor category, a load type, a trailer gap, and a trailer features. Each of the components are considered separately for purposes of simplicity and accuracy.

The tractor category considers the type of tractor 16 being evaluated. There are four alpha tractor categories "A", "B", "C" and "D" each having their own particular aerodynamic characteristics. Each of the many commercially available tractors 16 belong to one of the four categories. The categories are based on empirically obtained aerodynamic information. The tractors 16 are organized by original equipment manufacturer (OEM). A pictorial representation of each of the tractor types of an OEM are arranged under the related OEM. A tractor category letter "A–D" is assigned to the pictorial representations. The tractor category for the tractor 16 being tested is obtained by first selecting the OEM, then selecting the tractor 16 which most closely resembles the tractor 16 being tested. These selections are made by the keyboard, mouse or any other suitable device. The information is displayed on the monitor 22.

As indicated in box 210, FIG. 3, an aerodynamic tractor and trailer load type correction factor "L" for the tractor and trailer combination 20 being tested is determined based on the tractor category selected, the trailer height and the type of trailer being utilized. A Load Type Correction Factor Table 42 having a grid-like structure is shown in FIG. 6. Each tractor category is listed along a left column. The trailer height and trailer type heads subsequent columns. To determine an aerodynamic tractor and trailer load type correction factor in percent one simply selects an appropriate trailer type, for example, by selecting an appropriate box for the tractor category and trailer type. When the tractor and trailer combination includes doubles or triples the trailer type with the worst aerodynamic properties is selected. Based on the selection, the processor 30 receives a corresponding signal and determines a corresponding aerodynamic tractor and trailer load type correction factor "L". The selection may be made by the keyboard 26, mouse 28 or other device of the load type correction factor table 42 displayed on monitor 22. A corresponding aerodynamic tractor and trailer load type correction factor is preferably provided for each of the boxes in memory 32. For example, the aerodynamic tractor and trailer load type correction factors may be stored in and selected from a look-up table or the like.

Referring to box 212, FIG. 3, the magnitude of space between the tractor 16 and trailer 18 also has an affect on the aerodynamics of the tractor and trailer combination 20 being tested. A Trailer Gap Correction Factor Table 44, as shown in FIG. 7, considers factors such as trailer height and gap. Selecting from table 44 an appropriate box, based on the gap (magnitude of the space) between the tractor 16 and trailer 18 and the height of the particular tractor and trailer combination being tested, results in a signal being delivered to the processor 30. The processor receives the signal and determines an aerodynamic trailer gap correction factor "G" for the tractor and trailer combination being tested. The aerodynamic trailer gap correction factor "G" is stored for subsequent processing. The selection may be made by the keyboard 26, mouse 28 or other devices. The Trailer Gap Correction Factor Table 44 is preferably displayed on monitor 22. A corresponding aerodynamic trailer gap correction factor for each of the possible selections is preferably provided for in memory 32. For example, the aerodynamic trailer gap correction factors may be stored in and selected from a look-up table or the like.

As indicated in box 214, FIG. 3, the ultimate aerodynamic determination is associated with special trailer features not considered above. A Trailer Features Correction Factor Table 46 (FIG. 8) identifies the special trailer features and the trailer height options. Selecting from table 46 the special trailer feature and the associated height of the particular tractor and trailer combination being tested, results in a signal being delivered to the processor 30. As can be seen, a "No Selection" is required should none of the special features be present. The processor receives the signal and determines an aerodynamic trailer features correction factor "F" for the tractor and trailer combination being tested. The aerodynamic trailer features correction factor is stored for subsequent processing. The selection may be made by the keyboard 26, mouse 28 or other devices. The Trailer Features Correction Factor Table 46 is preferably displayed on monitor 22. A corresponding aerodynamic trailer features correction factor for each of the possible selections is provided for in memory 32. For example, the aerodynamic trailer features correction factors may be stored in and selected form a look-up table or the like.

With reference to box 216, FIG. 3, an average ambient temperature prevailing at the time of the testing period, the time when fuel mileage was being recorded and the tractor and trailer combination 20 was in operation, is important to the accuracy of the estimated fuel consumption. The ambient temperature environment affects engine efficiency and needs to be considered in any fuel consumption estimate. The testing period=actual odometer or ECM Mileage÷miles driven per year. This formula is used when a lifetime estimated fuel consumption is desired. A shorter testing period (a minimum of one month) can also be selected when monthly records are kept by the person associated with the tractor and trailer combination 20. Knowing the month in which the testing period is completed and the length of the testing period one simply selects from the Average Daily Ambient Temperature Correction Factor Table 48 of FIG. 9 the length of the testing period in months and the month in which the testing period ends. The selection is made by way of the keyboard 26, a mouse 28 or other suitable well known input devices. The processor 30 receives a signal based on this selection determines an average daily ambient temperature correction factor "T" based on the signal for the tractor and trailer combination being tested and stores the average daily ambient temperature correction factor "T" for subsequent processing. The Average Daily Ambient Temperature Correction Factor Table 48 is preferably displayed on monitor 22. An average daily ambient temperature correction factor in percent corresponding to each of the possible selections is provided for in memory 32. For example, the percent average daily ambient temperature correction factors may be stored in and selected from a look-up table or the like. An authorized operator has the capability to change the average daily ambient temperature correction factor knowing that the tractor-trailer combination 20 may have been operated in a different climate (warmer or colder ).

Referring to box 218, FIG. 3, the average gross combination weight (GCW) at which the tractor and trailer combination 20 operates also has an effect on fuel and must be considered in any estimate. An average gross combination weight correction factor "W" for the particular tractor and trailer combination 20 being tested is determined by selecting a percentage of time of operation at gross combination weight and the gross capacity weight of the tractor and trailer combination 20 being tested from an Average GCW Correction Factor Table 50, FIG. 10. A signal is delivered to the processor 30 subsequent to selection of the percentage of time of operation at GCW and the magnitude of the GCW in pounds. The processor, based on this signal, determines the average gross combination weight correction factor "W" of the particular tractor and trailer combination 20 being tested for the testing period. The average gross combination weight correction factor "W" is stored for subsequent processing. The selection is made by way of the keyboard 26, a mouse 28 or other suitable well known input devices. The Average GCW Correction Factor Table 50 is preferably displayed on monitor 22. An average gross combination weight correction factor "W" in percent corresponding to each of the possible selections is provided for in memory 32. For example, the percent average gross combination weight correction factors may be stored in and selected from a look-up table or the like.

With reference to box 220, FIG. 3, the idle time in percent for the tractor and trailer combination 20 being tested is obtained either from the ECM 12 or estimated by one intimate with the particular tractor and trailer combination 20 being tested. An idle time correction factor is determined by selecting from an Idle Time Correction Factor Table 52, FIG. 11, the percentage of time, rounded to the nearest 5percent, at which the engine 14 of the preselected tractor and trailer combination 20 is at idle for the testing period. A signal is delivered to the processor 30 in response to the selection from the Idle Time Correction Factor Table 52. The processor 30 receives this signal and determines an idle time correction factor "I" for the percentage of time selected for the preselected tractor and trailer combination 20. The idle time correction factor "I" is stored for subsequent processing. The selection is made by way of the keyboard 26, a mouse 28 or other suitable well known input devices. The Idle Time Correction Factor Table 52 is preferably displayed on monitor 22. An idle time correction factor in percent corresponding to each of the possible selections is provided for in memory 32. For example, the idle time correction factors may be stored in and selected from a look-up table or the like.

With reference to box 222, FIG. 3, a tire correction factor "A" for the tractor and trailer combination 20 being tested is obtained from one knowledgeable with the particular tractor and trailer combination 20 being tested. The tire correction factor is determined by selecting from a Tire Correction Factor Table 54, FIG. 12, the type of tire used on the tractor 16 and trailer 18. A signal is delivered to the processor 30 in response to the selection(s) from the Tire Correction Factor Table 54. The processor 30 receives the signal(s) and determines a tire type correction factor "A" for the tractor and trailer combination 20 in accordance with the equation: tractor tire correction factor+trailer tire correction factor= tire correction factor. The tire correction factor "A" is stored for subsequent processing. The selection is made by way of the keyboard 26, a mouse 28 or other suitable well known input devices. The Tire Correction Factor Table 54 is preferably displayed on monitor 22. An tire correction factor for each tire type in percent corresponding to each of the possible selections is provided in memory 32. For example, the tire correction factors may be stored in and selected from a look-up table or the like.

Referring to box 224, FIG. 3, the type of road upon which the tractor and trailer combination 20 operates and the frequency of operation also has a significant impact on the fuel consumption and requires consideration in the estimate. It has been found that operation of the tractor and trailer combination 20 on two lane roads ten percent or more of the time negatively affects the fuel consumption. By selecting a frequency of travel on two lane roads (based on historical information or past experience) from a predetermined list of frequencies a signal is delivered to the processor 30. The selection is made by way of the keyboard 26, a mouse 28 or other suitable well known input devices. The processor 30 determines a road correction factor "R" from the signal and stores the correction factor in percent for subsequent processing. A road correction factor in percent for the frequency of operation on two lane roads corresponding to each of the possible selections is provided in memory 32. For example, the road correction factors may be stored in and selected from a look-up table or the like.

Referring to box 226, the fuel consumption of the engine 14 is also affected by the API gravity of the fuel. The API gravity value (corrected to 60 degrees Fahrenheit) at the time the fuel mileage was checked is selected from an Average API Fuel Gravity Correction Factor Table 56, FIG. 13. A signal is delivered to the processor 30 in response to a selection of the API fuel gravity from the Average API Fuel Gravity Correction Factor Table 56. The selection is made by way of the keyboard 26, a mouse 28 or other suitable well known input devices. The processor 30 determines an average API fuel gravity correction factor "B" from the signal and stores the correction factor "B" in percent for subsequent processing. An average API fuel gravity correction factor in percent for each of the possible selections is provided in memory 32. For example, the API fuel gravity correction factors may be stored in and selected from a look-up table or the like.

As shown in box 228, FIG. 3, the correction factors determined above are summed by the processor 30 to determine a combined correction factor "CCF" (CCF=E+ S+L+G+F+T+W+I+A+R+B). As shown in box 230, the total estimated fuel consumption "EFC" in miles per gallon for the tractor and trailer combination 20 being tested is determined by the processor 32 based on the combined correction factor "CCF" determined above. This determination is preferably based on the Total Estimated Fuel Conversion Table 58, FIG. 14. An "EFC" in miles per gallon for each of the possible "CCF's" is listed on Table 58. The information of table 58 is provided in memory 32.

As shown in box 233, the magnitude of the total estimated fuel consumption is recorded by the processor 32. This recording includes displaying the magnitude of the total estimated fuel consumption on the monitor 22 graphically or numerically in miles per gallon. Alternatively, this may be printed on paper by way of the printer 24.

Referring to FIG. 15, an Estimated Fuel Consumption Summary 60 is shown in substantial detail. The summary 60 has four columns. The first column to the left identifies the preselected parameters listed numerically in the sequentially adjacent right columns, MPG penalties, MPG Gains. Parameter Base Line information is listed in the far right column. The parameters listed are related to preselected ones of the correction factors identified in the above discussion. The parameters are listed in a descending order of importance. It is to be recognized that the number of parameters may deviate from those listed without departing from the spirit of the invention. Only one of the fuel consumption Penalties and Gains for each of the parameters listed will have a numerical value displayed. This is attributed to the fact that for a given parameter there cannot be both a gain and a loss. For example, if there is an excessive amount of time spent with the engine 14 idling there would be a penalty associated with fuel consumption for the particular tractor and trailer combination 20 being tested. At the bottom of the chart is listed the total estimated fuel consumption for the particular tractor and trailer combination 20 being tested. The summary 60 is preferably displayed on the monitor 22 and/or printed on paper via the printer 24.

The processor 30 ranks the correction factors or the corresponding estimated fuel consumption penalty and gain parameters in a descending order of importance. The processor 30 signals the monitor 22 to display preselected ones of the ranked estimated fuel consumption penalty and gain parameters in the manner set forth above. The processor 30 may signal the printer to print such information on paper.

The processor 30 determines the total actual fuel consumption "AFC" from the actual mileage and a total quantity of fuel used, compares the actual total fuel consumption to the estimated total fuel consumption, and delivers a responsive difference signal. The monitor 22 displays the fuel consumption difference in positive or negative values response to this signal.

INDUSTRIAL APPLICABILITY

With reference to the drawings, and in operation, the method for identifying at least one of a plurality of predetermined operating conditions (parameters or factors) attributable to the total actual fuel consumption of a predetermined tractor and trailer combination 20 being greater in magnitude than the magnitude of the total estimated fuel consumption is processed by way of the computer 10. The processor 30, receives an operating condition signal in response to selections made by way of the keyboard 26, mouse 28 and the like related to each of the various operating conditions, and determines a correction factor for each of the plurality of operating conditions. The processor 30 determines an estimated fuel consumption for each of the plurality of correction factors and lists the magnitude of each estimated fuel consumption in a summary according to one of a gain and a penalty, and displays the summary on the monitor 22.

The processor 30 receives fuel consumption related signals delivered from either of the input device (input by the keyboard) or the engine control module (downloaded to the computer). The processor 30 determines the total actual fuel consumption in MPG from the fuel consumption related signals. The processor 30 combines the correction factors (CCF=E+S+L+G+F+T+W+I+A+R+B and determines a total estimated fuel consumption "EFC" for the engine driven tractor and trailer combination 20 from the combined correction factor "CCF". The total estimated fuel consumption is preferably selected from the Total Estimated Fuel Consumption Conversion Table 58. The processor 30 commands the monitor 22 to display the total estimated fuel consumption rate "EFC".

The processor 30 determines a difference between the total estimated fuel consumption "EFC" and the total actual fuel consumption "AFC" of the engine driven tractor and trailer combination 20. Any significance in the listing of each of the fuel consumption penalties and gains in the Estimated Fuel Consumption Summary table 60 is disregarded in response to the difference in magnitude between the total estimated fuel consumption "EFC" and the total actual fuel consumption being less than a predetermined magnitude.

Conversely, a difference in magnitude between the total estimated fuel consumption "EFC" of the engine driven tractor and trailer combination 20 and the total actual fuel consumption of the engine driven tractor and trailer combination 20 being at or greater than a preselected magnitude suggests a potential problem in engine operation, driving habits and the like. The penalties listed on the summary table 60 indicate by their magnitude conditions contributing to the problem.

Other aspects, objects and advantages of the present invention can be obtained from a study of the drawings, the disclosure and the appended claims.

I claim:

1. A method for estimating the fuel consumption of a preselected engine driven tractor and trailer combination, said method including a processor, and comprising the steps of:

selecting a preselected engine type and determining an engine type correction factor "E" based on the selected engine type;

estimating a normal cruise speed of the engine driven tractor and trailer combination and determining an estimated cruise speed correction factor "S" based on the received predetermined estimated normal cruise speed;

selecting a tractor category and trailer type and determining an aerodynamic tractor and trailer load type correction factor "L" based on the tractor category and trailer type;

selecting a magnitude of space between the tractor and trailer and a trailer height and determining an aerodynamic trailer gap correction factor "G" corresponding to the space between the tractor and trailer and the trailer height;

selecting at least one a plurality of special trailer features and determining an aerodynamic trailer features correction factor "F" based on the special features selected;

receiving a preselected testing period determining an average daily ambient temperature correction factor "T" for the preselected testing period;

selecting a percentage of time of operation at gross combination weight and the gross combination weight of the tractor trailer combination and determining an average gross combination weight correction factor "W" based on the percentage of time of operation at gross combination weight and the gross combination weight of the tractor trailer combination;

selecting a percentage of time at which the engine is at idle for the testing period and determining an engine idle time correction factor "I" for the percentage of time selected;

selecting a tire type in use on the tractor and trailer and determining a tire correction factor "A" based on the preselected tire type in use on the engine driven tractor and trailer combination;

selecting an estimated travel frequency on a two lane road and determining a road correction factor "R" based on the estimated travel frequency;

selecting a predetermined API gravity value at a time of fuel mileage checking and determining an average fuel API gravity correction factor "B" based on the selected API gravity value;

summing the correction factors in steps a–k to determine a combined correction factor "CCF";

determining a total estimated fuel consumption "EFC" based on the combined correction factor "CCF"; and recording a magnitude of the total estimated fuel consumption.

2. The method, as set forth in claim 1, including a monitor and wherein said step of recording the magnitude of the total estimated fuel consumption includes the step of displaying the magnitude of the said total estimated fuel consumption on the monitor.

3. The method, as set forth in claim 1, including a monitor and wherein the step of recording a magnitude of the total estimated fuel consumption includes the step of displaying the magnitude of the total estimated fuel consumption numerically in miles per gallon on said monitor.

4. The method, as set forth in claim 2, including the steps of:

determining one of an estimated fuel consumption penalty and gain related to preselected ones of the correction factors "E", "S", "L", "G", "F", "T", "W", "I", "A", "R", and "B"; and displaying on said monitor in a descending order of importance said one estimated fuel consumption penalty and gain related to each of the preselected correction factors.

5. The method, as set forth in claim 4, including a printer connected to said processor, including the step of printing on a paper said one estimated fuel consumption penalty and gain related to each of the preselected correction factors.

6. The method, as set forth in claim 4, including the step of displaying on said monitor a base line parameter related to each of the preselected correction factors.

7. The method, as set forth in claim 1, wherein the step of determining an average daily ambient temperature correction factor "T", includes the steps of:

- receiving an actual and an annual mileage of the tractor and trailer combination and determining a testing period from the actual and annual mileage of the tractor and trailer combination;
- receiving a month of the year in which the testing period ended; and
- determining the average daily ambient temperature correction factor "T" based on the testing period and the month of the year in which the testing period was recorded.

8. The method, as set forth in claim 1, wherein the step of determining an average daily ambient temperature correction factor "T" includes the step of obtaining said average daily ambient temperature correction factor "T" from a table.

9. The method, as set forth in claim 1, wherein the step of determining said aerodynamic tractor and trailer load type correction factor "L" includes the steps of:

- selecting from a tractor type table a tractor category having a tractor most resembling the tractor being tested; and
- selecting a load type correction factor "L" from a load type correction factor table listing trailer types by said tractor category.

10. The method, as set forth in claim 9, wherein the step of determining the aerodynamic trailer gap correction factor "G" includes the step of selecting, based on the preselected space between the tractor and trailer and a preselected trailer height, a trailer gap correction factor "G" from a trailer gap correction factor table.

11. The method, as set forth in claim 10, wherein said step of determining an aerodynamic trailer features correction factor "F" includes the step of selecting for the preselected testing period an aerodynamic trailer features correction factor "F" from an aerodynamic trailer features correction factor table.

12. The method, as set forth in claim 1, wherein the step of determining a total estimated fuel consumption "EFC" includes the step of selecting the value of the total estimated fuel consumption "EFC" for the combined correction factor "CCF" from a fuel consumption table.

13. The method, as set forth in claim 1, wherein said processor is connected to an engine control module and including the step of receiving at least one of an actual mileage, an annual mileage, a normal cruise speed, and an idle time signal from the engine control module.

14. The method, as set forth in claim 13, including the steps of:

- determining an actual fuel consumption based on the actual mileage and a total quantity of fuel used;
- comparing the actual fuel consumption to the estimated fuel consumption and displaying the difference.

15. A method for identifying at least one of a plurality of operating conditions attribute to an actual total fuel consumption being greater in magnitude than the magnitude of a total estimated fuel consumption of an engine driven tractor and trailer combination, said method including a processor and a monitor; and comprising the steps of:

- receiving a plurality of operating condition signals;
- determining a correction factor for each of the plurality of operating condition signals;
- determining one of a fuel consumption gain and penalty for each of said plurality of correction factors;
- listing said one fuel consumption gain and penalty related to each of said plurality of correcting factors in an estimated fuel consumption summary table;
- displaying said estimated fuel consumption summary table on the monitor.

16. The method, as set forth in claim 15, including the steps of:

- receiving fuel consumption related signals from one of an input device and an engine control module;
- determining a total actual fuel consumption "AFC" based on said fuel consumption related data;
- combining each of said correction factors;
- determining a total estimated fuel consumption from the combined correction factor; and
- displaying the total estimated fuel consumption "EFC" on said monitor.

17. The method, as set forth in claim 16, including the step of selecting said total estimated fuel consumption "EFC" for the engine driven tractor and trailer combination from a total estimated fuel consumption conversion table.

18. The method, as set forth in claim 16, including the steps of:

- determining a difference between the total estimated fuel consumption "EFC" and the total actual fuel consumption rate "AFC" of the engine driven tractor and trailer combination; and
- disregarding any significance in the fuel consumption penalties and gains listed in the estimated fuel consumption summary in response to a difference in magnitude between the total estimated fuel consumption and the total actual fuel consumption being less than a predetermined magnitude.

19. The method, as set forth in claim 16, including the steps of:

- determining a difference between the total estimated fuel consumption "EFC" and the total actual fuel consumption rate "AFC" of the engine driven tractor and trailer combination; and
- displaying said difference on the monitor.

* * * * *